US009471565B2

(12) United States Patent
Barbosa et al.

(10) Patent No.: US 9,471,565 B2
(45) Date of Patent: Oct. 18, 2016

(54) SYSTEM AND METHOD FOR LOCATING BILINGUAL WEB SITES

(75) Inventors: Luciano De Andrade Barbosa, Madison, NJ (US); Srinivas Bangalore, Morristown, NJ (US); Vivek Kumar Rangarajan Sridhar, Florham Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 937 days.

(21) Appl. No.: 13/194,668

(22) Filed: Jul. 29, 2011

(65) Prior Publication Data

US 2013/0030788 A1    Jan. 31, 2013

(51) Int. Cl.
*G06F 17/28*    (2006.01)
*G06F 17/30*    (2006.01)

(52) U.S. Cl.
CPC ..... *G06F 17/2845* (2013.01); *G06F 17/30864* (2013.01)

(58) Field of Classification Search
CPC ............... G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC ....................................................... 704/2–8
See application file for complete search history.

(56) References Cited

U.S. PATENT DOCUMENTS

| 5,659,765 | A  | * | 8/1997  | Nii ................................... 704/4 |
| 7,805,289 | B2 |   | 9/2010  | Zhou et al. |
| 8,271,869 | B2 | * | 9/2012  | Aue ............................... 715/234 |
| 8,306,806 | B2 | * | 11/2012 | Shi et al. ........................... 704/3 |
| 8,515,934 | B1 | * | 8/2013  | Shaw .............................. 707/706 |
| 8,670,975 | B2 | * | 3/2014  | Jiang et al. ........................ 704/4 |
| 2006/0277175 | A1 |   | 12/2006 | Jiang et al. |
| 2008/0010056 | A1 |   | 1/2008  | Zhou et al. |
| 2008/0097742 | A1 | * | 4/2008  | Ushioda ............................ 704/3 |
| 2008/0126076 | A1 | * | 5/2008  | Ming et al. ....................... 704/4 |
| 2009/0182547 | A1 | * | 7/2009  | Niu et al. .......................... 704/2 |
| 2010/0138211 | A1 | * | 6/2010  | Shi et al. ........................... 704/3 |
| 2010/0241416 | A1 | * | 9/2010  | Jiang et al. ....................... 704/7 |
| 2010/0286978 | A1 | * | 11/2010 | Zhou et al. ....................... 704/7 |
| 2010/0306249 | A1 | * | 12/2010 | Hill et al. ...................... 707/769 |
| 2012/0089898 | A1 | * | 4/2012  | Aue ............................... 715/234 |

(Continued)

OTHER PUBLICATIONS

Arasu et al., Searching the Web, 2001, ACM Transactions on Internet Technology, vol. 1, No. 1, pp. 2-43.*

(Continued)

*Primary Examiner* — Lamont Spooner

(57) ABSTRACT

Disclosed herein are systems, methods, and non-transitory computer-readable storage media for bootstrapping a language translation system. A system configured to practice the method performs a bidirectional web crawl to identify a bilingual website. The system analyzes data on the bilingual website to make a classification decision about whether the root of the bilingual website is an entry point for the bilingual website. The bilingual site can contain pairs of parallel pages. Each pair can include a first website in a first language and a second website in a second language, and a first portion of the first web page corresponds to a second portion of the second web page. Then the system analyzes the first and second web pages to identify corresponding information pairs in the first and second languages, and extracts the corresponding information pairs from the first and second web pages for use in a language translation model.

17 Claims, 5 Drawing Sheets

(56) References Cited

U.S. PATENT DOCUMENTS

2012/0259833 A1* 10/2012 Paduroiu ............... 707/709
2013/0030788 A1* 1/2013 Barbosa et al. ............ 704/2

OTHER PUBLICATIONS

Kit et al., Kit, An Intelligent Web Agent to Mine Bilingual Parallel Pages via Automatic Discovery of URL Pairing Patterns, 2007 ACM, Proceedings of the 2007 IEEE/WIC/ACM International Conferences on Web Intelligence and Intelligent Agent Technology-Workshops, pp. 526-529.*

Ahlers et al., "Adaptive Geospatially Focused Crawling". In Proceeding of the 18th ACM conference on Information and knowledge management, pp. 445-454, Nov. 2-6, 2009.

Barbosa et al., "Searching for hidden-web databases", Eighth International Workshop on the Web and Databases (WebDB 2005), pp. 1-6, Jun. 16-17, 2005.

Barbosa et al., "An adaptive crawler for location hidden-web entry points", In World Wide Web Conference Committee (IW3C2), pp. 441-450, May 8-12, 2007.

Bharat et al., "The connectivity server: Fast access to linkage information on the web", Computer Networks and ISDN Systems, 30(1-7): pp. 469-477, 1998.

Cavnar et al., "N-gram-based text categorization", Environmental Research Institute of Michigan. pp. 161-175, 1994.

Chakrabarti et al., "Accelerated focused crawling through online relevance feedback", In WWW2002, pp. 148-159, May 7-11, 2002.

Chakrabarti et al., "Focused crawling: A new approach to topic-specific web resource discovery", Published by Elsevier Science B.V., Computer Networks, 31 (11-16): pp. 1623-1640, 1999.

Chen et al., "Discovering parallel text from the World Wide Web", The Australasian Workshop on Data Mining and Web Intelligence (DMWI-2004), Conferences in Research and Practice in Information Technology, vol. 32, pp. 161-165, 2003.

Chen et al., "Parallel web text mining for cross-language IR", In RIAO, vol. 1, pp. 62-78, 2000.

Diligenti et al., "Focused Crawling Using Context Graphs", Proceedings of the $26^{th}$ VLDB Conference, Cairo, Egypt, pp. 527-534, 2000.

Gangaputra et al., "A design principle for coarse-to-fine classification", In Computer Vision and Pattern Recognition, vol. 2, pp. 1877-1884, 2006.

Grossman et al., "Information retrieval: Algorithms and heuristics",(The Information Retrieval Series) ($2^{nd}$ Edition). Kluwer Academic Pub, Book, Publication date Dec. 20, 2004.

Hong et al., "An empirical study on web mining of parallel data", In Proceedings of the 23rd International Conference on Computational Linguistics, COLING '10, pp. 474-482, Beijing, Aug. 2010.

Jiang et al., "Mining bilingual data from the web with adaptively learnt patterns", In Proceedings of the 47th Annual Meeting of the ACL and the $4^{th}$ IJCNLP of the AFNLP, pp. 870-878, Suntec, Singapore, Aug. 2-7, 2009.

Koehn, Philipp, "Europart: A parallel corpus for statistical machines translation", In MT summit, vol. 5, 2005.

Ma et al., "Bits: A method for bilingual text search over the web", In Machine Translation Summit VII, 1999.

Melamed, I. Dan, "Empirical methods for exploiting parallel texts", MIT Press, Book Publication Date Jan. 22, 2001.

Munteanu et al., "Improving machines translation performance by exploiting non-parallel Corpora", Computation Linguistics, vol. 31, No. 4, pp. 477-504, 2006.

Olston et al., "Web Crawling", Foundations and Trends in Information Retrieval, vol. 4, No. 3, pp. 175-246, 2010.

Platt, John C., "Probabilistic outputs for support vector machines and comparisons to regularized likelihood methods", pp. 61-74, Mar. 26, 1999.

Rennie et al., "Using Reinforcement Learning to Spider the Web Efficiently", In ICML, pp. 335-343, 1999.

Resnik, Philip, "Parallel strands: A preliminary investigation into mining web for bilingual text", Machine Translation and the Information Soup. pp. 72-82, Aug. 7, 1998.

Resnik et al., "The web as a parallel corpus", Association for Computational Linguistics, 2003.

Tomas et al., "WebMining: An unsupervised parallel corpora web retrieval system", In Proceedings from the Corpus Linguistics Conference, 2005.

Uszkoreit et al., "Large scale parallel document mining for machine translation", In Proceedings of the $23^{rd}$ International Conference on Computational Linguistics,(COLING 2010), pp. 1101-1109, Association for Computational Linguistics, Beijing, Aug. 2010.

Zhang et al., "Automatic Acquisition of Chinese-English Parallel Corpus from the Web", Advances in Information Retrieval, pp. 420-431, 2006.

Erdmann et al., "Using an SVM Classifier to Improve the Extraction of Bilingual Terminology from Wikipedia", Graduate School of Information Science and Technology, 2009.

* cited by examiner

SYSTEM AND METHOD FOR LOCATING BILINGUAL WEB SITES

BACKGROUND

1. Technical Field

The present disclosure relates to locating bilingual web pages and more specifically to efficiently crawling linked documents to discover bilingual web pages and bilingual document pairs.

2. Introduction

Recently, there has been an increased interest for sources of professional quality parallel text in two or more languages for tasks such as machine translation and cross-language information retrieval. Although previous work addresses many aspects of this problem, including document pair selection, and sentence and word alignment, the problem of efficiently discovering bilingual data sources on large scale networks, such as the World Wide Web, has not been adequately addressed.

To make the search for parallel text more feasible, previous approaches rely on the assumption that parallel texts mainly occur within Web pages. Thus, the search for parallel text can include two steps. The first step is to locate bilingual sites, and the second step is to extract the parallel text from them. Previous approaches mainly focus on the second step and do not address the first step. Previous work restricts the crawler in a top-level Internet domain (TLD) expected to contain a high concentration of these sites. For instance, previous approaches focus the crawler in a particular TLD, such as .de, when searching for German/English language pairs.

Previous approaches detect bilingual sites by extracting the anchor text and image alt text and matching them with a predefined list of strings in the languages of interest. If the web page contains at least two matched links in the different languages it is a match. The main problem of this approach is in terms of recall because bilingual sites that use patterns not represented or recognized by the predefined list are not detected. Another solution for this problem verifies if there is bilingual text at pages of the top 3 or 4 levels of the web page by using a language identifier. This approach can be very costly in terms of storage, bandwidth, and/or processing because it may need to download a considerable portion of the web page to make its decision.

Along the same line, one existing approach obtains two sets of candidate sites by issuing queries as anchor: "english version" to a search engine, and then take the union. Another approach discovers document pairs by first selecting the top words in a source language document, translating these words and issuing them as a query to a search engine. The main limitation of these approaches is that they only rely on the search engine results to obtain the parallel pages. Because search engines restrict the total number of results per query and the number of requests, the rate of processing sites in this way is extremely limited.

Further, some previous approaches rely on hand-picked bilingual web pages, requiring significant amounts of human knowledge, time, and effort. These approaches do not scale well, add cost, and can introduce inaccurate information through human error. These and other problems exist which hinder the identification of bilingual web pages.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for bootstrapping a language translation system. The method is discussed in terms of a system configured to practice the method. The system performs a bidirectional web crawl to identify bilingual web sites. The bidirectional web crawl can consider back links and forward links and can further be based on a bipartite graph representing the back links and the forward links. The back links and forward links can be associated with a respective relevance score. The respective relevance scores can be generated via supervised learning with a support vector machine. The respective relevance score can be based on a context of a link in a neighborhood of elements.

The system analyzes data on the web page to make a classification decision about whether the root page of a website is an entry point for a bilingual website, wherein the bilingual pair of web pages includes a first web page in a first language and a second web page in a second language, and wherein a first portion of the first web page corresponds to a second portion of the second web page. The classification decision can be based on a title, a link to another language page, a link neighborhood, a link context, and/or data indicating separate versions of a page in the target languages. The classification decision can determine whether a web page is an entry point to a bilingual site. A frontier scheduler can generate a list of links for use in the bidirectional web crawl.

Then the system analyzes the first web page and the second web page to identify corresponding information pairs in the first language and the second language, and extracts the corresponding information pairs from the first web page and the second web page for use in a language translation model. The corresponding information pairs can include a word pair, a phrase pair, a sentence pair, and/or a paragraph pair. The system can bootstrap the language translation model using the corresponding information pairs. The language translation model can be a machine translation model, a cross-lingual document retrieval model, or a language model, for example. The system can also augment a statistical model with domain representative data based on the corresponding information pairs.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for automatically identifying bilingual document or information pairs in web documents. A brief introductory description of a basic general purpose system or computing device in FIG. 1 which can be employed to practice the concepts is disclosed herein. Multiple variations shall be discussed herein as the various embodiments are set forth. The disclosure now turns to FIG. 1.

Figure 1:
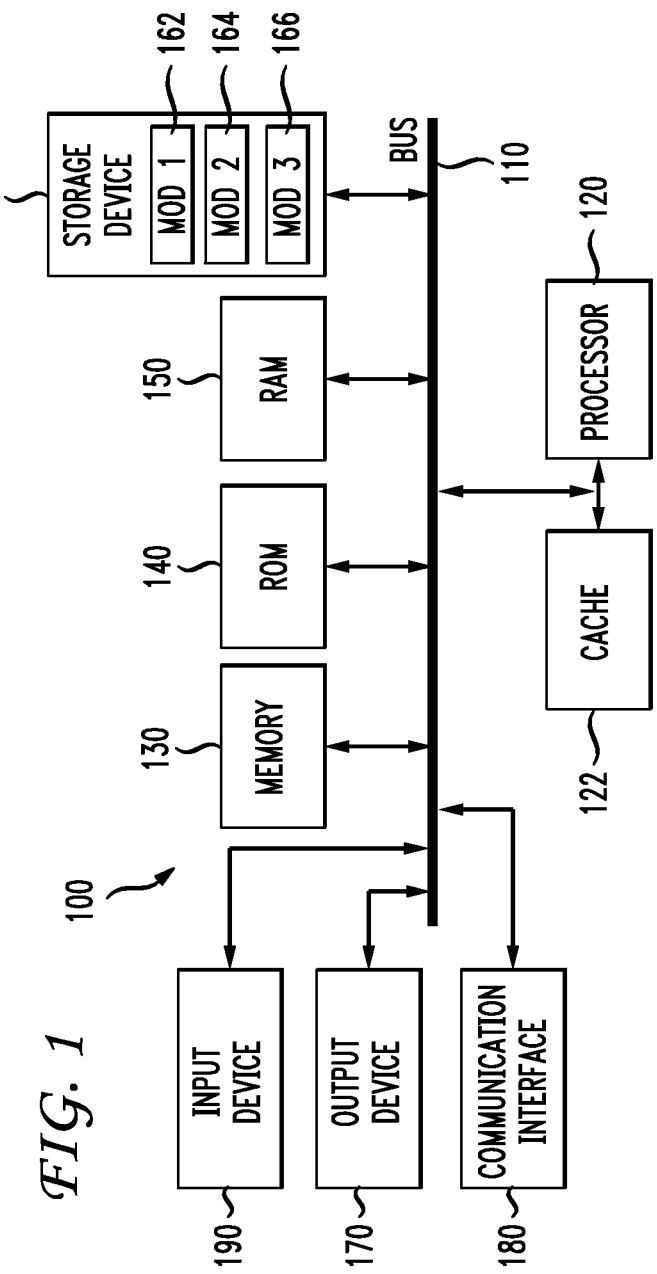
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of processing bilingual web pages. Disclosed herein is a crawling strategy to locate bilingual sites which aims to achieve a balance between the two conflicting requirements of this problem: the need to perform a broad search while at the same time avoiding the need to crawl unproductive Web regions. This crawling strategy focuses on the graph neighborhood of bilingual sites and exploring the patterns of the links in this region to guide its visitation policy. To detect such sites, the system implements a two-step strategy. The first step relies on common patterns found in the internal links of these sites to compose a classifier that identifies candidate pages as entry points to parallel data in these sites. The second step verifies whether these pages are in fact in the languages of interest. Experimental data show that this approach outperforms previous crawling approaches for this task and produces a high-quality collection of bilingual sites.

Parallel text can be useful for tasks such as machine translation and cross-language information retrieval. The European Parliament proceedings and official documents of countries with multiple languages have been widely used as parallel text, for example. Although these are high-quality corpora, they have some limitations: (1) they tend to be unbalanced, i.e., restricted to a particular domain (e.g. governmental texts); (2) there are not available in many languages; and (3) sometimes they are not free or there is some restriction for using them. Web data, on the other hand, is free and includes different languages and domains. Web data can represent a very diverse set of domains, such as art, hotel, and business domains.

The strategy disclosed herein divides the overall problem in two sub-problems: (1) to locate sites that contain bilingual data, so-called bilingual sites; and (2) to extract parallel texts within these sites. This approach assumes that parallel texts are present in the same site.

Figure 2:
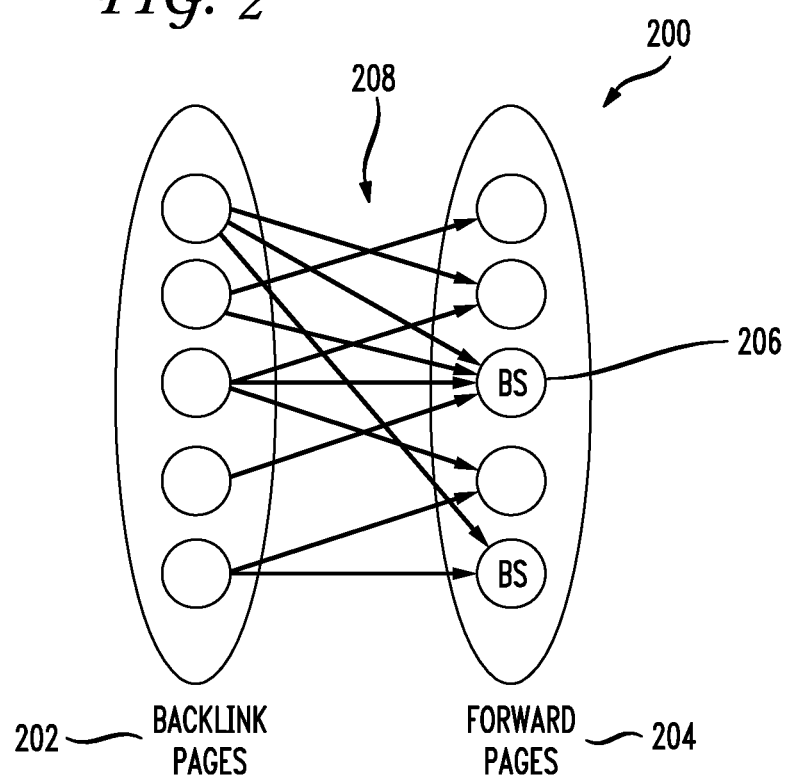
FIG. 2 illustrates an example bipartite graph of backward links and forward links.

Much of the prior art focuses on the second sub-problem, but ignores the first sub-problem. The strategy disclosed herein discovers bilingual sites on the World Wide Web or other interconnected network of resources. Existing crawlers locate different kinds of Web sources such as web pages in a topic, geographic information, web forms, and so forth. The approach disclosed herein uses not only forward links but also backlinks to perform a broad search for bilingual sites while at the same time avoiding the need to crawl unproductive web regions. More specifically, the exemplary crawler keeps its search in the bipartite graph composed by the backlink pages (BPs) of bilingual sites, already discovered by the crawler, and the pages pointed by BPs (forward pages), as illustrated in FIG. 2. FIG. 2 illustrates an example bipartite graph 200 representing the graph neighborhood visited by the crawler. Backlink pages 202 point to bilingual sites (BS) 206 and other pages (forward pages) 204. Web regions represented in this bipartite graph are rich in bilingual sites, mainly because backlink pages might point to multiple bilingual sites.

To focus on the most promising regions in this graph, the crawler explores the patterns presented in its links to guide its visitation policy.

The crawler locates and/or detects bilingual sites in an efficient way. One simple approach is to visit the whole Web page for parallel text. This, however, is very costly, does not scale well, and in some cases may not be workable solution because the web pages may contain hundreds or thousands of pages. The crawling approach disclosed herein provides a low-cost strategy that visits very few pages in the Web page to make its prediction. First, given a Web page, the crawler uses supervised learning to identify links in the page that are good candidates to point to parallel text in this site. Then the crawler verifies whether the pages pointed by the candidate links are in fact in the languages of interest.

The principles disclosed herein provide at least three benefits. First, this approach can locate bilingual sites in a scalable, effective, and efficient way. Second, the new crawling strategy uses the bipartite graph including the backlink pages of the targeted sources (such as bilingual web pages), already discovered by the crawler, and the pages pointed to by these pages. The crawler uses link classifiers specialized in each layer of the bipartite graph to focus on the most promising regions in this graph. Third, this approach detects bilingual sites efficiently and in high-precision based on supervised learning and language identification.

The disclosure turns now to a discussion of a bilingual site crawler. Although the exemplary crawler is directed to discovering bilingual sites, the same principles can be applied, with some modifications, to other networks of related documents and/or data.

A naïve approach to collect parallel data is to check for every pair of Web pages. This naïve approach can be extremely costly on large-scale networks, such as the World Wide Web.

Figure 3:
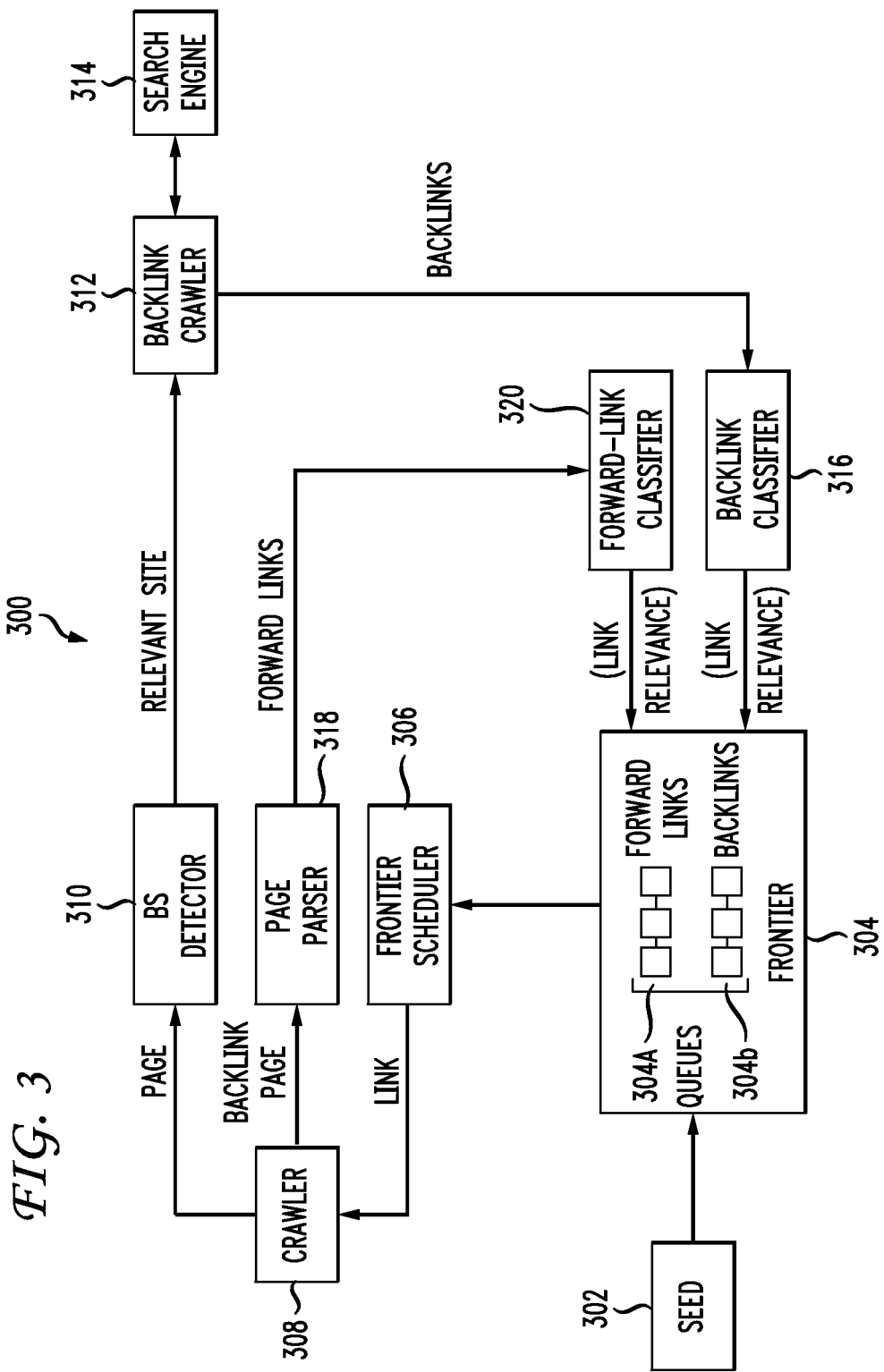
FIG. 3 illustrates an example architecture for crawling and identifying bilingual sites.

The new crawling strategy to locate these Web pages follows backlinks and outlinks, keeping the crawler in the graph neighborhood of the already-discovered relevant sites. A two step approach detects bilingual web pages using supervised learning and language identification. FIG. 3 illustrates an exemplary architecture 300 for crawling and identifying bilingual sites.

The crawler 308 downloads a page, p and sends it to the bilingual site detector (BS Detector) 310. If the BS detector 310 predicts that the site represented by p contains parallel text, the backlink crawler 312 collects the backlinks of p, i.e., links that point to p. The backlink crawler 312 can obtain the backlinks from a search engine 314, via a web query, a direct backlink API call, or via some other communication. The backlink classifier 316 predicts the relevance of these links and adds the links to the backlink queue 304B in the frontier 304. The backlink classifier 316 can insert links into the queue based on priority, urgency, wait time, and/or any other factor. The frontier 304 can also include a queue of forward links 304A. In order to kick start the crawling process, a user or other entity can provide a seed 302 to the frontier 304 (or to one or more other components of the architecture 300) as an initial crawling point from which the crawler 308 begins parsing pages. The frontier scheduler 306 sends a highest priority backlink or the next backlink in the queue to the crawler 308, which downloads its content. Finally, the page parser 318 extracts the forward links of the backlink page, the forward-link classifier 320 identifies the most promising forward links in that page and add them to the forward-link queue 304A in the frontier 304. The core elements of the crawler 308 are discussed in further detail below.

Figure 4:
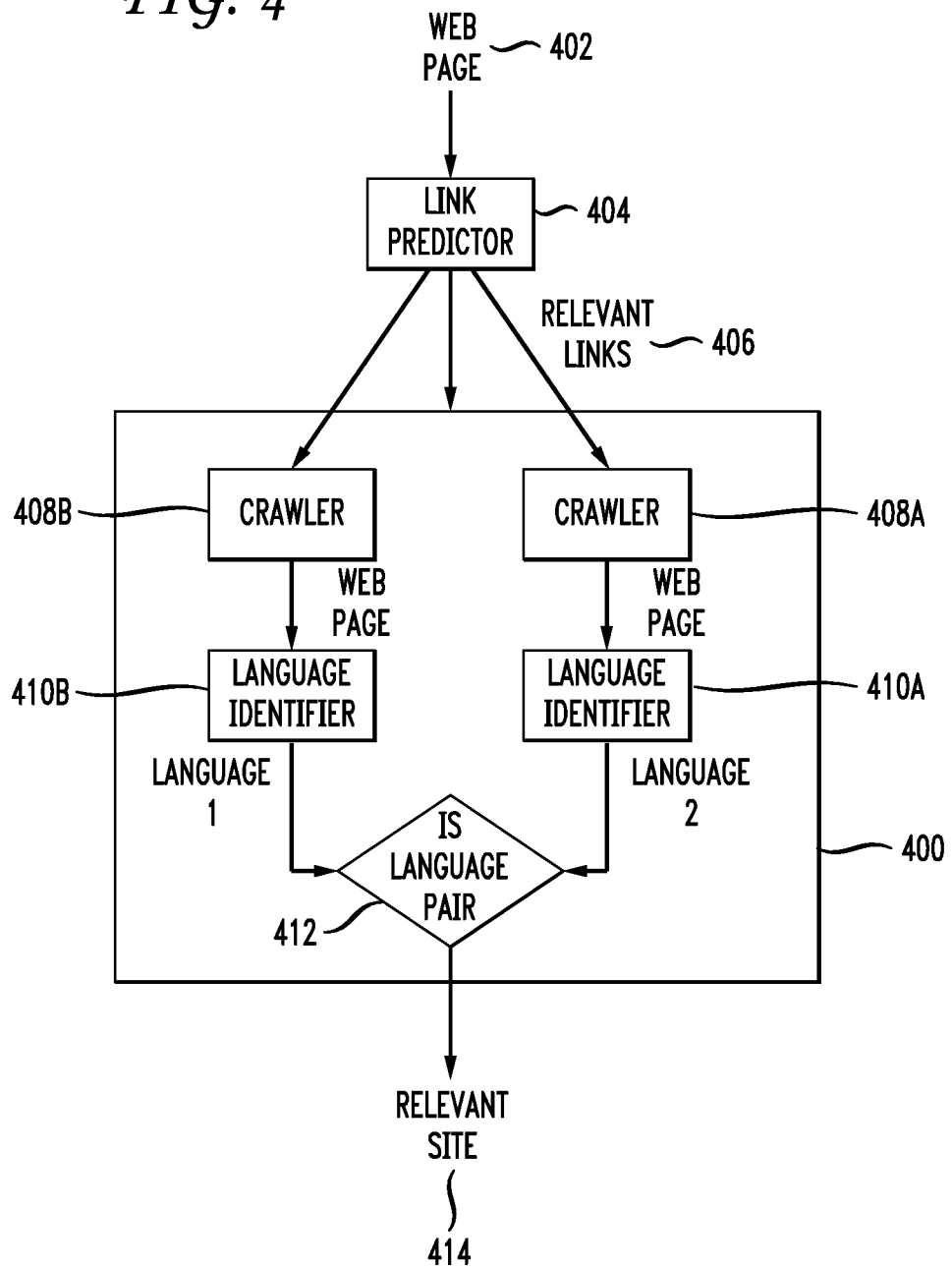
FIG. 4 illustrates an example architecture for a bilingual site detector.

FIG. 4 illustrates an example architecture for a bilingual site (BS) detector 400, 310. This architecture can detect parallel sites and deals with the main limitations of the existing approaches. First, instead of using a predefined list of patterns to detect these sites, the BS detector 400 uses supervised learning to predict if a given page 402 has links to parallel data via a link predictor 404. Second, to avoid downloading a great portion of the web page, the BS Detector 400 only verifies whether the pages whose URLs are considered relevant 406 by the link predictor 404 are in different languages. The example BS detector 400 operates according to a two-step approach to identify bilingual sites.

The role of the link predictor 404 is to identify links that point to parallel text in a given web page. The link predictor 404 can explore patterns in the links, but instead of relying solely on a predefined list, the link predictor 404 can incorporate supervised learning based on the assumption that pages of bilingual sites typically contain some common link patterns. For example, a page in English can contain a link to its corresponding version in Spanish, containing words as "español" and "castellano" in its anchor, URL, and so forth. In some sites, the link does not provide any textual information to the user. Instead the site includes an image (usually a country flag) representing the link. In order to handle different types of patterns in the links, the link predictor 404 uses various features, such as tokens in the URL, anchor, around, image alt and image source. The last two can be important when there is no visible text information. A probabilistic support vector machine (SVM) can serve as the learning algorithm to create and/or update the link predictor 404, because SVMs perform well on text data and the class likelihood of the instances.

The link predictor 404 works as a low-cost filter. Its cost is associated to the link classifications which is very low. The link predictor 404 also prunes the search space considerably for the most costly second step by discarding pages with few or no relevant links 406.

The second step of the BS detector 400 is to verify if the pages having relevant links 406 are in the languages of interest. This component is unique to bilingual text based tasks. For each candidate relevant link 406 identified by the link predictor 404, a crawler 408A, 408B fetches the web page indicated by the link, and a language identifier 410A, 410B identifies the language of the fetched web page. The BS detector 400 can contain multiple different crawlers 408A, 408B and language identifiers 410A, 410B that operate in parallel, such as one for each desired language pair, but other suitable arrangements exist. For example, the BS detector 400 can contain a single crawler and multiple language identifiers, or a single crawler and a single language identifier that operate serially on relevant links 406. A page in a given language may only contain a link to its translation in the other language but not links to both versions. The language identifiers 410A, 410B process all pages of that list and, a language pair detector 412 determines if the different pages are in the language of interest and flags the relevant site 414 as bilingual. The language identifiers 410A, 410B can incorporate the TextCat language guesser or similar technology. Although there is some cost in downloading the pages to perform this step, it is only necessary to download in average 2 to 3 pages per site, because the link predictor 404 considerably prunes the search space.

The disclosure turns now to crawling policy and locating bilingual sites on the web. The crawler is not restricted to any particular internet domain or topic. The crawler can perform a broad search for bilingual sites, while avoiding visiting unproductive web regions. This strategy can be implemented by primarily keeping the crawler in the web neighborhood graph of bilingual sites previously discovered by the crawler. More specifically, the crawler explores the neighborhood graph defined by the bipartite graph, an example of which is shown in FIG. 2, guided based on backlink pages (BPs) of bilingual sites and forward links on a bilingual site. The backlinks are pages that link to a web page, whereas forward links are links found on that web page that point elsewhere. The backlinks are not typically contained in that web page, but can be obtained from a search engine or other external source, for example. This approach is based on an assumption that the web region represented by the bipartite graph is rich in bilingual sites, mainly because backlink pages might point to multiple bilingual sites. Algorithm 1, presented below, provides one example implementation of this strategy in detail.

---

Algorithm 1

---

1:  Input: seeds, BS_Detector
    {seeds : seeds provided by the user, BS_Detector : the bilingual site detector}
2:  frontier = 0
    {create the empty frontier}
3:  frontier.addLinks(seeds)
    {add the seeds to the frontier}
4:  repeat
5:      link = frontier.next( )
        {retrieve from the frontier the next link to be visited}
6:      page = download(link)
        {download the content of the page}
7:      if BS_Detector.isRelevant(page) then
8:          backlinks = collectBacklinks(page)
            {collect the backlinks to the given page provided by a search engine}
9:          frontier.addLinks(backlinks)
            {add the backlinks to the frontier}
10:     end if
11:     if link.isBacklink( ) then
12:         outlinks = extractOutlinks(page)
            {extract the outlinks of a backlink page}
13:         frontier.addLinks(outlinks)
            {add the outlinks to the frontier}
14:     end if
15: until frontier.isEmpty( )

---

Initially, the user (or other entity) provides one or more seed URLs as a starting point for the frontier. The crawler then starts to download the links in the frontier. If the BS detector identifies a page in a bilingual site, the system retrieves backlinks to this page and adds the backlinks to the frontier. Backlink information can be retrieved through a backlink or other API provided by search engines such as AltaVista, Google and Yahoo. In a next step, the system downloads the pages represented by the backlinks, extracts their outlinks, and adds them to the frontier as well. The system only adds outlinks to the frontier from backlink pages. The crawler does not explore outlinks of forward pages, which are pages pointed by backlink pages.

Keeping the crawler in the graph neighborhood of bilingual sites, according to the bipartite graph mentioned earlier, is one component of an effective search for bilingual sites. However, the graph may contain links that lead to certain relevant sites whereas others are absent. Supervised learning can identify promising links in the two different layers of the bipartite graph. More specifically, for each layer (backlink and forward layers), the crawler can build a classifier that outputs the relevance of a given link for that particular layer. Relevant links for the forward pages layer represent URLs of bilingual sites, i.e., links that give immediate benefit, whereas relevant links for the backlink page layer are URLs of backlink pages that contain outlinks to bilingual sites, providing a delayed benefit.

The system can incorporate multiple classifiers as a way to decompose a complex problem into simpler subproblems in which each classifier is dedicated to a subset of more homogenous hypothesis. The multiple classifiers can guide the crawler. However, instead of looking at link patterns, the classifiers can use the content of the pages.

Thus, the Forward-Link classifier predicts the most promising links for the forward pages, whereas the Backlink Classifier identifies the most promising links for the backlink pages. Both classifiers use as features the neighborhood of links. The link neighborhood can be based on multiple points of context. Four exemplary context points are URL, host, anchor, and text around the link. Because the number of extracted features tends to be large and most of them have very low frequency, the system can optionally remove stop-words (such as "the", "is", "at", "which", "on", and so forth) and stem the remaining words. Stemming is a way to reduce inflected words to their base or root form. For example, the words "fishing", "fished", "fish", and "fisher" can all be stemmed to their root word "fish".

Features can be associated with a context. For example, if the word "hotel" appears in both in the URL and in the anchor text of a link, the system can add "hotel" as a feature in both contexts. Words in the host context can play an important role, because many parallel corpus sites are in country-based TLDs, such as .es, .de, etc. Instead of pre-defining a set of domains, the crawler automatically identifies the most important pages during the crawling process.

The two classifiers perform different roles. For the Backlink classifier, features as "link" and "directory" demonstrated a high information gain in training data. These words usually occur in the URL of pages that point to many different sites, for example http://www.rentaccomspain-.com/links.asp. The Forward Link classifier focuses more on topics, as demonstrated by words as "hotel", "air", "art" and "language". The two classifiers can automatically adapt during the crawling process. More specifically, initially, the crawler starts with no link prioritization. After a specified number of crawled pages, the system can perform a learning iteration by collecting the link neighborhood of the links that point to relevant and non-relevant pages in each layer, thereby generating training data for each classifier. Then the system can create the Backlink and Forward-Link classifiers, optionally incorporating one or more naïve Bayes algorithms. As the last step, the system can update the relevance of the links in the frontier based on the new classifiers.

The Frontier Scheduler schedules the next link or links to be visited by the crawler. The Frontier Scheduler can be implemented as a set of two queues: a forward-link queue and a backlink queue. Within a queue, the scheduler can order links based on their likelihood of belonging relevant according to its respective classifier. Similarly, if another entity inserts links into the queues, that entity can insert the links according to their importance or priority.

To produce some kind of fairness among the links, the crawling frontier can update in batches. When the crawler starts, all seeds are placed in the forward-link queue. At each step, the crawler selects the link with the highest likelihood from the first nonempty queue. New backward and forward links are added to a separate persistent frontier according to its respective classifier. Only when the queues in the crawling frontier become empty or are about to become empty, the crawler loads the queues from the persistent frontier. Since the system focuses on links that bring some kind of immediate benefit, the forward link queue will often contain more elements than the backlink queue in the frontier. Experimental data show that the initial proportion of the queue sizes was 10 forward-link to 1 backlink.

The crawler can incorporate a mechanism to change these values as the crawl progresses. For instance, the crawler might start getting a higher proportion of backlinks if the current set of backlinks is not generating as many forward links.

Figure 5:
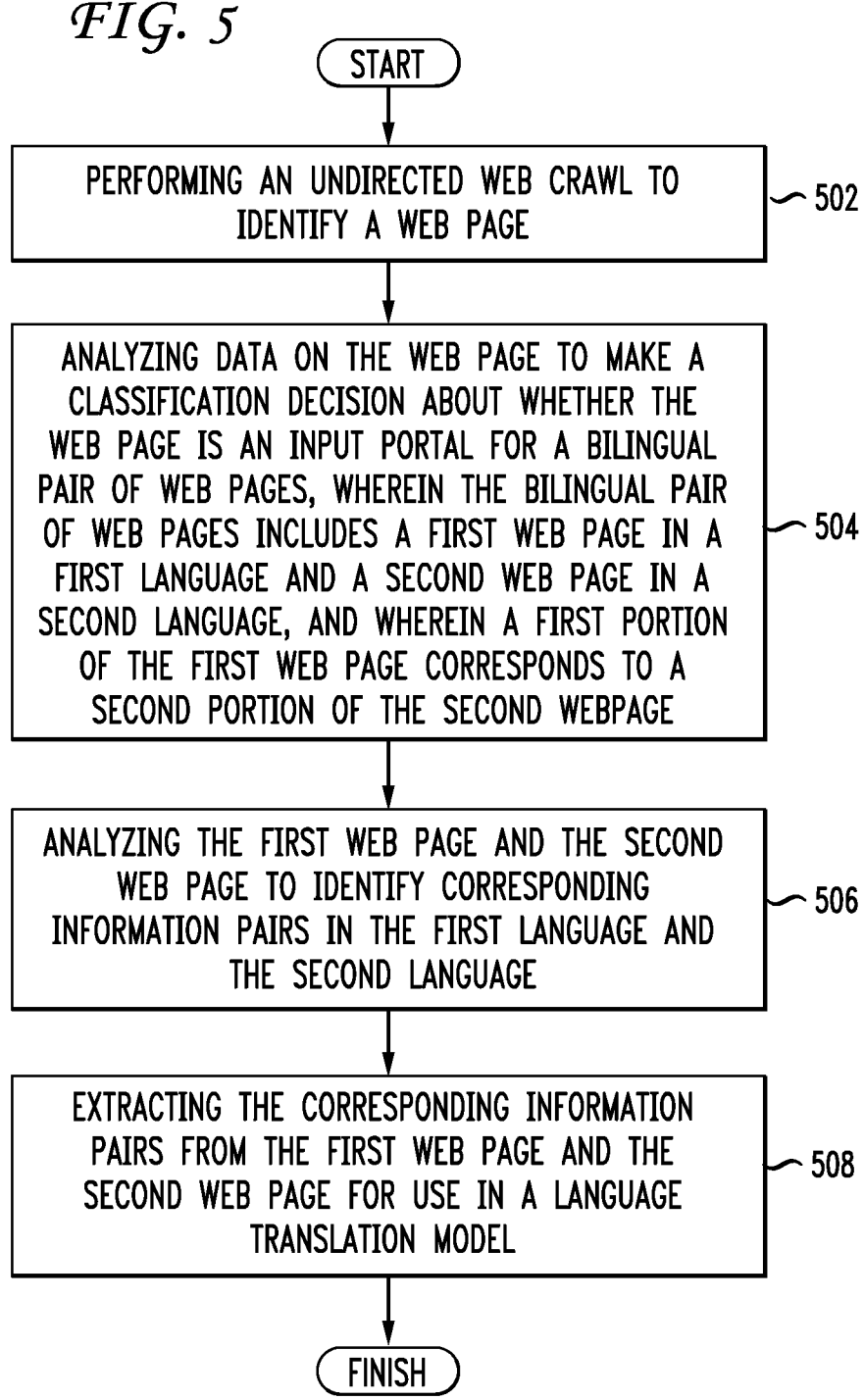
FIG. 5 illustrates an example method embodiment.

Having disclosed some basic system components and concepts, the disclosure now turns to the exemplary method embodiment shown in FIG. 5. For the sake of clarity, each of the methods is discussed in terms of an exemplary system 100 as shown in FIG. 1 configured to practice the respective method. The steps outlined herein are exemplary and can be implemented in any combination thereof, including combinations that exclude, add, or modify certain steps.

The system 100 performs a bidirectional web crawl to identify a bilingual website (502), or receives an indication of a web page identified in a web crawl. The bidirectional web crawl can consider back links and forward links and can further be based on a bipartite graph representing the back links and the forward links. The back links and forward links can be associated with a respective relevance score. The respective relevance scores can be generated via supervised learning with a support vector machine. The respective relevance score can be based on a context of a link in a neighborhood of elements.

Parallel text acquisition from the web is an attractive way for augmenting statistical models (e.g., machine translation, cross-lingual document retrieval, language modeling) with domain representative data. The basis for obtaining such data is a collection of pairs of bilingual web sites or pages. The crawling strategy can locate bilingual web sites by constraining the visitation policy of the crawler to the graph neighborhood of bilingual sites on the web. Subsequently, a recursive mining technique can iteratively extract text and links from the collection of bilingual websites obtained from the crawling. This approach does not suffer from the prohibitive combinatorial matching typically used in previous work that use document retrieval techniques to match a collection of bilingual web pages. Experimental data show that parallel text obtained using this crawling strategy resulted in an absolute improvement of 17% in Bilingual Evaluation Understudy (BLEU) score over an out-of-domain seed translation model (English-Spanish language pair). The bilingual crawling strategy can be used to obtain parallel text across several domains by designing appropriate visitation policies.

The crawling strategy can locate bilingual web sites by crawling the web optimally to discover bilingual sites. In other words, the crawling strategy avoids crawling unproductive regions. The web crawler can focus on the graph neighborhood of bilingual sites and explore link patterns in this region to guide the visitation policy. A recursive mining technique extracts the text and links from a high quality collection of root bilingual web sites. The recursive procedure is highly parallelizable and facilitates accelerated intra-site crawling. Machine translation accuracy can be vastly improved by exploiting the parallel text acquired using this focused crawling strategy. The improvements are demonstrated in the context of augmenting large out-of-domain MT models with in-domain web parallel text. This approach does not require a machine translation system in any step, and can use only a word lexicon that is either available freely or obtained through automatic alignment of out-of-domain training data as seed.

The system 100 analyzes data on the bilingual website to make a classification decision about whether the root of the bilingual website is an entry point for the bilingual website, wherein the bilingual site contains pairs of parallel pages, wherein each pair includes a first web page in a first language and a second web page in a second language, and wherein a first portion of the first web page corresponds to a second portion of the second web page (504). The classification decision can be based on a title, a link to another language page, a link neighborhood, a link context, and/or data indicating separate versions of a page. The classification decision can determine whether a web page is an input portal to a pair of bilingual web pages. A frontier scheduler can generate a list of links for use in the bidirectional web crawl. The system can analyze web pages in a generic web crawling application to determine whether the web pages are an input portal to a pair of web pages. Then grouping or selecting the pair of web pages for additional study and/or analysis. The web crawl can be topic-specific or can be a general knowledge domain web crawl.

Then the system 100 analyzes the first web page and the second web page to identify corresponding information pairs in the first language and the second language (506), and extracts the corresponding information pairs from the first web page and the second web page for use in a language translation model (508). The corresponding information pairs can include a word pair, a phrase pair, a sentence pair, and/or a paragraph pair. The system can bootstrap the language translation model using the corresponding information pairs. The language translation model can be a machine translation model, a cross-lingual document retrieval model, or a language model, for example. The system can also augment a statistical model with domain representative data based on the corresponding information pairs.

The principles disclosed herein use not only forward links but also backlinks to focus the crawler in richer web regions for the targeted web source. It is important to point out here that the use of backlinks typically relies on search engine APIs or some other external source. For that reason, this crawler is optimally applied to domains whereby the Web source is not easily found by using forward crawling, such as bilingual sites. The disclosed crawling approach also creates a classifier associated with a layer of links.

The approaches disclosed herein provide an efficient and focused crawling strategy to locate bilingual sites. Crawling results are stored in a bipartite graph representing the backlink pages of bilingual sites, already discovered by the crawler, and the pages they point to. To focus on the most promising regions in this graph, the crawler explores the patterns presented in its links to guide its visitation policy. Another benefit is the low-cost and high-precision strategy to detect a bilingual site by relying on common patterns found in the internal links of these sites to compose a classifier that identifies links pages as entry points to parallel data in these sites, and verifying whether these pages are in fact in the languages of interest. Experimental data show that this crawling strategy is more effective to find bilingual sites than the baselines. Further, this crawling strategy for bilingual site detection has high-precision and operates in a very efficient manner.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein for crawling to discover bilingual web pages can be applied to other types of domains whereby a more traditional focused crawling has issues to find the targeted Web sources, such as Web forms. Those skilled in the art will readily recognize various modifications and changes that may be made to the principles described herein without following the example embodiments and applications illustrated and described herein, and without departing from the spirit and scope of the disclosure.

We claim:

1. A method comprising:
performing a generic web crawl to identify a first webpage in a first language having a link thereon which points to a second webpage in a second language, wherein the first webpage and the second webpage comprise a bilingual website comprising the first webpage and the second webpage in respective languages;
based on an analysis of parameters on the first webpage comprising at least two of: the link pointing to the second webpage, a title, a link neighborhood, a link context and data indicating a separate version of the first webpage, classifying the first webpage as a root page and as an entry point for the bilingual website via the link to the second webpage;
identifying, using a visitation policy which constrains web-crawling to a graph neighborhood of bilingual websites, a pattern of links within between the first webpage and the second webpage, to yield a bipartite graph;
ranking a relevance of candidate links which point to parallel text in the first webpage and the second webpage, to yield classifications of links based on the bipartite graph and the relevance;
performing, based on the relevance, a bidirectional web crawl of the candidate links, to identify the first webpage and the second webpage as a bilingual website, the bidirectional web crawl utilizing the classifications of links to avoid links having a low respective relevance;
analyzing the first webpage and the second webpage to identify information pairs in the first language and the second language;
extracting the information pairs from the first webpage and the second webpage for use in a language translation model, the information pairs comprising at least one of a sentence pair and a paragraph pair; and
updating a statistical model with domain representative data using the information pairs.

2. The method of claim 1, wherein the information pairs comprise one of a word pair, a phrase pair, a sentence pair, and a paragraph pair.

3. The method of claim 1, further comprising bootstrapping the language translation model using the information pairs.

4. The method of claim 1, wherein identification of the bilingual website comprises identifying the pair of parallel pages.

5. The method of claim 1, wherein the bidirectional web crawl considers back links and forward links.

6. The method of claim 5, wherein each of the back links and the forward links is associated with a relevance score.

7. The method of claim 6, wherein the relevance score is based on a context of a link in a neighborhood of elements.

8. The method of claim 1, wherein the relevance is based on supervised learning via a support vector machine and a link predictor, and wherein the link predictor filters irrelevant pages when the irrelevant pages have less than a threshold amount of relevant links.

9. The method of claim 1, wherein a frontier scheduler generates a list of links for use in the bidirectional web crawl.

10. The method of claim 1, further comprising augmenting a statistical model with domain representative data based on the information pairs.

11. The method of claim 1, wherein the language translation model is one of a machine translation model, a cross-lingual document retrieval model, and a language model.

12. A system comprising:
a processor;
a computer-readable storage memory having instructions stored which, when executed by the processor, cause the processor to perform operations comprising:
performing a generic web crawl to identify a first webpage in a first language having a link thereon which points to a second webpage in a second language, wherein the first webpage and the second webpage comprise a bilingual website comprising the first webpage and the second webpage in respective languages;
based on an analysis of parameters on the first webpage comprising at least two of: the link pointing to the second webpage, a title, a link neighborhood, a link context and data indicating a separate version of the first webpage, classifying the first webpage as a root page and as an entry point for the bilingual website via the link to the second webpage;
identifying, using a visitation policy which constrains web-crawling to a graph neighborhood of bilingual websites, a pattern of links within between the first webpage and the second webpage, to yield a bipartite graph;
ranking a relevance of candidate links which point to parallel text in the first webpage and the second webpage, to yield classifications of links based on the bipartite graph and the relevance;
performing, based on the relevance, a bidirectional web crawl of the candidate links, to identify the first webpage and the second webpage as a bilingual website, the bidirectional web crawl utilizing the classifications of links to avoid links having a low respective relevance;
analyzing the first webpage and the second webpage to identify information pairs in the first language and the second language;
extracting the information pairs from the first webpage and the second webpage for use in a language translation model, the information pairs comprising at least one of a sentence pair and a paragraph pair; and
updating a statistical model with domain representative data using the information pairs.

13. The system of claim 12, wherein the information pairs comprise one of a word pair, a phrase pair, a sentence pair, and a paragraph pair.

14. The system of claim 12, the computer-readable storage medium having additional instructions which, when executed by the processor, cause the processor to perform operations comprising bootstrapping the language translation model using the information pairs.

15. A computer-readable storage device having instructions stored which, when executed by a computing device, cause the computing device to perform operations comprising:
performing a generic web crawl to identify a first webpage in a first language having a link thereon which points to a second webpage in a second language, wherein the first webpage and the second webpage comprise a bilingual website comprising the first webpage and the second webpage in respective languages;

based on an analysis of parameters on the first webpage comprising at least two of: the link pointing to the second webpage, a title, a link neighborhood, a link context and data indicating a separate version of the first webpage, classifying the first webpage as a root page and as an entry point for the bilingual website via the link to the second webpage;

identifying, using a visitation policy which constrains web-crawling to a graph neighborhood of bilingual websites, a pattern of links within between the first webpage and the second webpage, to yield a bipartite graph;

ranking a relevance of candidate links which point to parallel text in the first webpage and the second webpage, to yield classifications of links based on the bipartite graph and the relevance;

performing, based on the relevance, a bidirectional web crawl of the candidate links, to identify the first webpage and the second webpage as a bilingual website, the bidirectional web crawl utilizing the classifications of links to avoid links having a low respective relevance;

analyzing the first webpage and the second webpage to identify information pairs in the first language and the second language;

extracting the information pairs from the first webpage and the second webpage for use in a language translation model, the information pairs comprising at least one of a sentence pair and a paragraph pair; and updating a statistical model with domain representative data using the information pairs.

16. The computer-readable storage device of claim 15, wherein identification of the bilingual website comprises identifying the pair of parallel pages.

17. The computer-readable storage device of claim 15, wherein the bidirectional web crawl considers back links and forward links.

\* \* \* \* \*